M. BARASH.
PULLEY ATTACHMENT FOR AUTOMOBILE WHEELS.
APPLICATION FILED OCT. 22, 1915.
1,188,714.
Patented June 27, 1916.
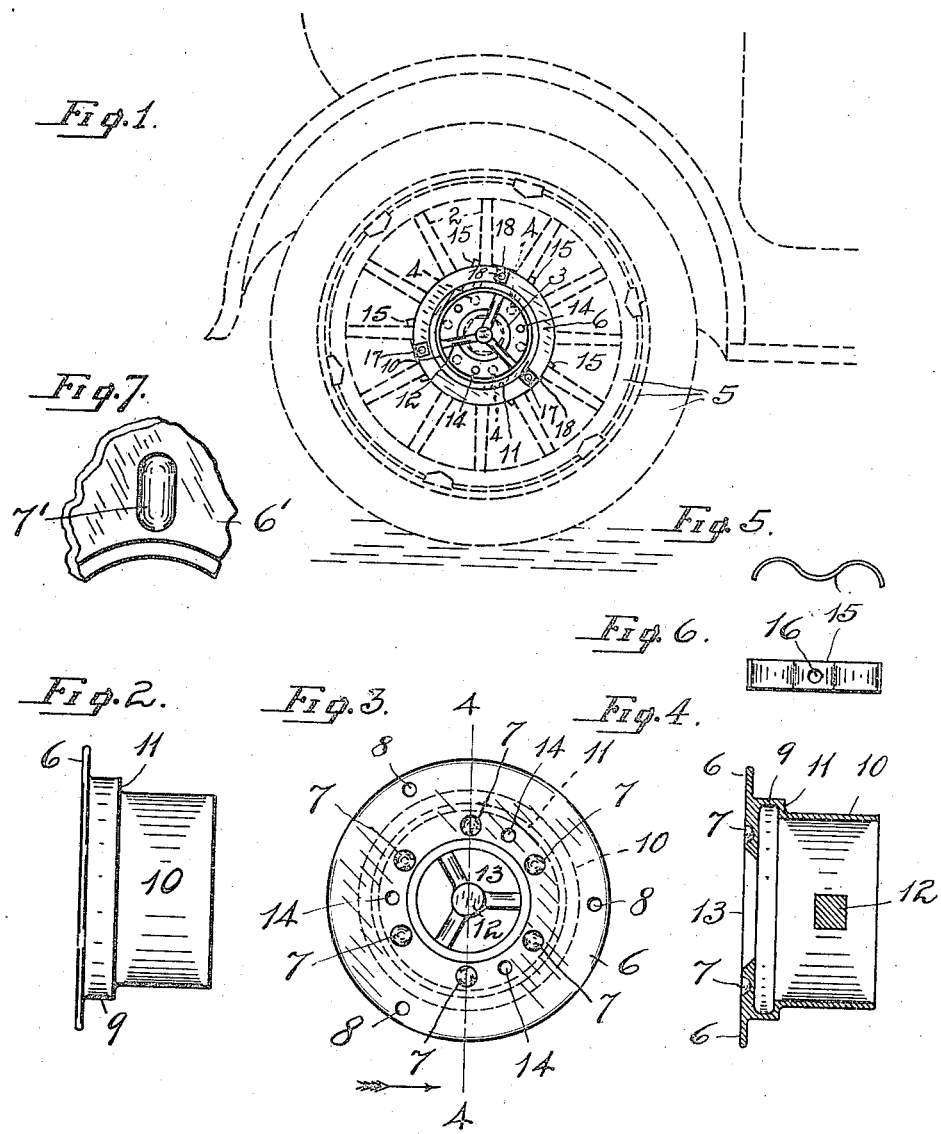
WITNESS:
John C. Ballentine
INVENTOR:
Max Barash,
By H. N. Richards, Atty.

UNITED STATES PATENT OFFICE.

MAX BARASH, OF MAQUON, ILLINOIS.

PULLEY ATTACHMENT FOR AUTOMOBILE-WHEELS.

1,188,714.   Specification of Letters Patent.   Patented June 27, 1916.

Application filed October 22, 1915.   Serial No. 57,274.

*To all whom it may concern:*

Be it known that I, MAX BARASH, a citizen of the United States, and a resident of Maquon, in the county of Knox and State of Illinois, have invented a new and useful Pulley Attachment for Automobile-Wheels, of which the following is a specification.

My invention relates to means attachable to a driving wheel of an automobile whereby the engine thereof may operate a driven mechanism.

The principal object of the invention is to provide means whereby an automobile engine and one of the driving wheels may so transmit motion from the wheel.

Another object is to provide suitable means for temporarily securing the attachment to the wheel.

Still another object is to so construct the attachment that portions of the wheel are caused to render the securement very rigid.

A still further object is to make provision whereby a single size attachment may be made to fit wheels of different sizes.

An additional object is to so construct the attachment that the belt driven thereby cannot come in contact with the tire of the wheel to which it is attached.

Minor objects will appear. Some of these will be obvious and others particularly pointed out.

In the accompanying drawings, which illustrate my invention: Figure 1 is a side elevation of a rear or driving wheel of an automobile, shown in broken lines, with my attachment secured thereto, the latter shown in full lines. Fig. 2, an elevation of the principal element of my improvement. Fig. 3, an elevation, seen from the inner face, or face which confronts the wheel, of the same element. Fig. 4, a sectional view, taken in the plane of the line 4—4 in Fig. 3. Fig. 5, an edge view of the spoke-clamp. Fig. 6, an elevation thereof; and Fig. 7, an enlarged, modified, fragmental detail.

In the different views like parts are designated by the same, and similar parts by similar reference characters.

2, 2 indicate the spokes, 3 the hub, and 4, 4, the bolts or rivets of the common type of automobile wheel 5.

6 designates an annulus having a central opening 13 adapted to fit over the hub of the wheel 5.

7, 7 indicate pits or pockets each of which is adapted to receive and fit over the projecting portion or head of a bolt or rivet 4.

Near its outer edge the annulus is provided with a suitable number of openings 8.

9 indicates an annular projection, and 10 a pulley or sheave slightly smaller in circumference, whereby a shoulder 11 is afforded.

12 indicates an interior reinforcement.

14, 14 denote openings through the annulus 6. They are arranged concentric to the openings 8.

15 designates a spring-bow clamp having a central aperture 16.

17 designates a bolt, and 18 a nut.

In the modification, Fig. 7, 6' designates a fragment of the annulus, and 7' an elongated pit or pocket.

To attach the device to the wheel 5 it is placed over the hub in such position that the head of each bolt will enter a pocket 7. This will bring each opening 8 into position to register or correspond with the opening between a pair of spokes 2. A clamp 15 is then so positioned that its outwardly bowed middle portion will rest between a pair of adjacent spokes, its inwardly bowed portions will stride said pair, and its opening 16 will register with the opening 8. A bolt 17 is then passed through said pair of openings and engaged by a nut 18. The other clamps are then to be positioned in like manner. The device will thus be locked with extreme rigidity upon the wheel, for it is held not only by the bolts, nuts and clamps to the spokes, but also by reason of the bolt-heads resting in the pockets 7, to the hub.

In the event of an emergency, as well as for other purposes, I have provided the openings 14, through which screws may be passed and threaded into the wheel.

In order that the device may be made to fit hubs of different sizes and the spoke-rivets therefore forming a circular series of greater or lesser diameter, the pockets or pits may be elongated, as shown in Fig. 7.

In use, the rear wheel is, of course, to be "jacked up." The power will be transmitted from the automobile engine, through the wheel, to the device and from it to a belt running on the sheave 10 in an evident manner. The belt will be prevented from coming in contact with the tire by reason of the outset shoulder 11.

It has not been thought necessary or best to encumber this specification and the accompanying drawing with descriptions and illustrations of modifications which are neither essential to nor form any part of the invention. In fact, it will be apparent without such that numerous changes may be made in details of construction, by modifications involving only mechanical skill, without departing from the spirit and scope of the invention, viewed in its broadest aspect.

Therefore, without limiting myself to particularities, except where such are particularly pointed out, I claim as my invention the following, namely:

1. The combination with a wheel the hub and spokes of which are united by bolts, of a sheave-carrying element having pockets adapted each to receive the end of a bolt, and means for holding said ends in said pockets.

2. A device of the character described comprising an annulus, as 6, having an offset projection, as 9, and a sheave, as 10, of less circumference than said projection, the annulus provided with a series of pockets each of which is adapted to receive the head of a wheel-hub bolt.

3. The combination with a wheel, of an annulus lying closely against the hub thereof and provided with pockets for the reception of the heads of the hub-bolts, said annulus having an annular axial projection from which extends a pulley, said pulley being smaller in size than said projection whereby a shoulder, as 11, is afforded, said shoulder preventing the pulley belt from coming in contact with the wheel rim, and means for securing the annulus to the wheel.

MAX BARASH.